US008669500B2

(12) United States Patent  (10) Patent No.: US 8,669,500 B2
Hensel et al.  (45) Date of Patent: Mar. 11, 2014

(54) INTERFACE DEVICE FOR OVEN

(75) Inventors: Keith James Hensel, Lane Cove (AU);
Ze Kang Lai, Glenfield (AU)

(73) Assignee: Breville Pty Limited, Botany, New South Wales (AU)

( * ) Notice: Subject to any disclaimer, the term of this patent is extended or adjusted under 35 U.S.C. 154(b) by 0 days.

(21) Appl. No.: 13/443,837

(22) Filed: Apr. 10, 2012

(65) Prior Publication Data

US 2012/0192850 A1   Aug. 2, 2012

Related U.S. Application Data

(62) Division of application No. 12/500,608, filed on Jul. 10, 2009, now abandoned.

(51) Int. Cl.
*H05B 1/02*   (2006.01)

(52) U.S. Cl.
USPC ............ 219/483; 219/506; 219/492; 99/339; 99/328

(58) Field of Classification Search
CPC ........................................ H05B 1/02
USPC ......... 219/492, 494, 497, 499, 506, 412–415, 219/720; 99/325–333, 339
See application file for complete search history.

(56) References Cited

U.S. PATENT DOCUMENTS

| 6,818,869 | B2 * | 11/2004 | Patti et al. ...................... 219/489 |
| 8,136,442 | B2 * | 3/2012 | Strutin-Belinoff et al. ..... 99/331 |
| 2012/0073558 | A1 * | 3/2012 | Wiker et al. ................ 126/21 A |

* cited by examiner

*Primary Examiner* — Mark Paschall
(74) *Attorney, Agent, or Firm* — Molins & Co. Pty. Ltd.

(57) ABSTRACT

A countertop multi-function oven has a baking and a toasting mode. The oven uses a rotating input dial as a function selector. A second rotating input dial is used to allow a user selection of a bake time or a toasting load.

12 Claims, 16 Drawing Sheets

BROIL (GRILL) CONFIGURATION

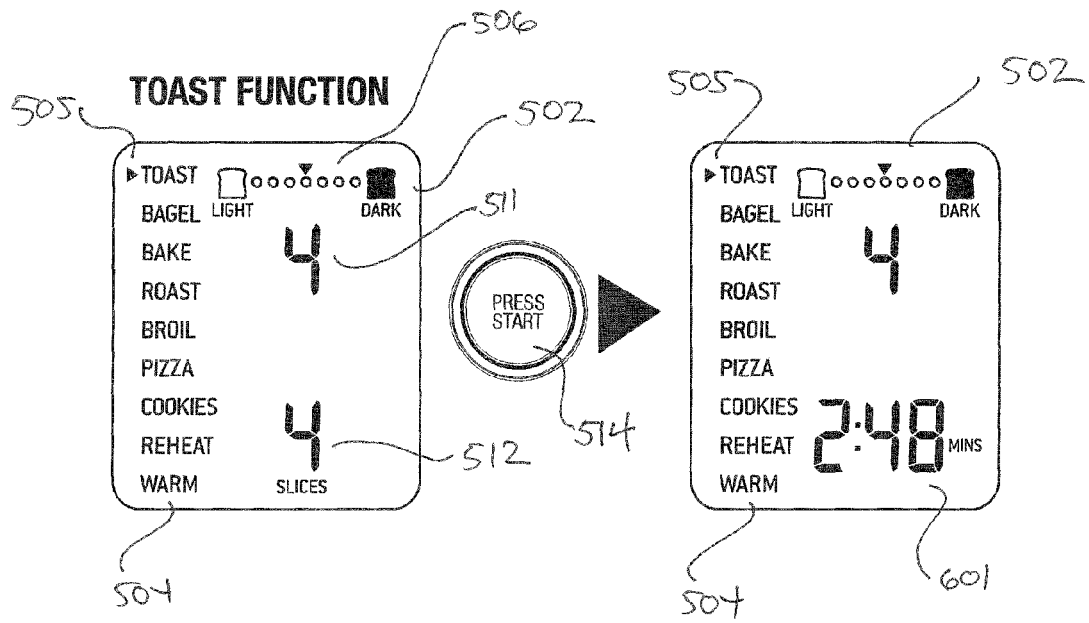
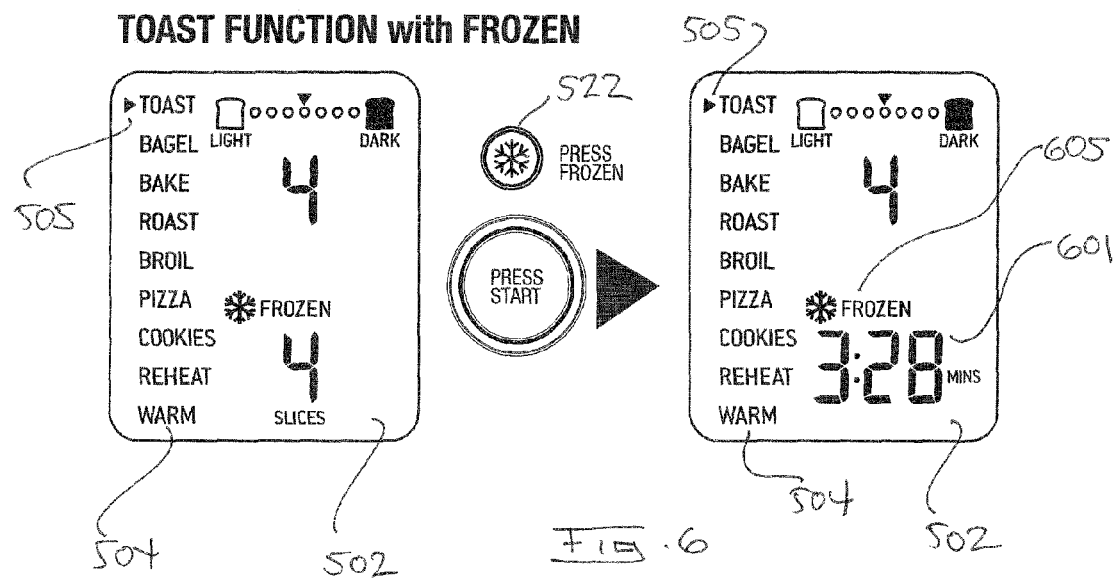
FIG. 6

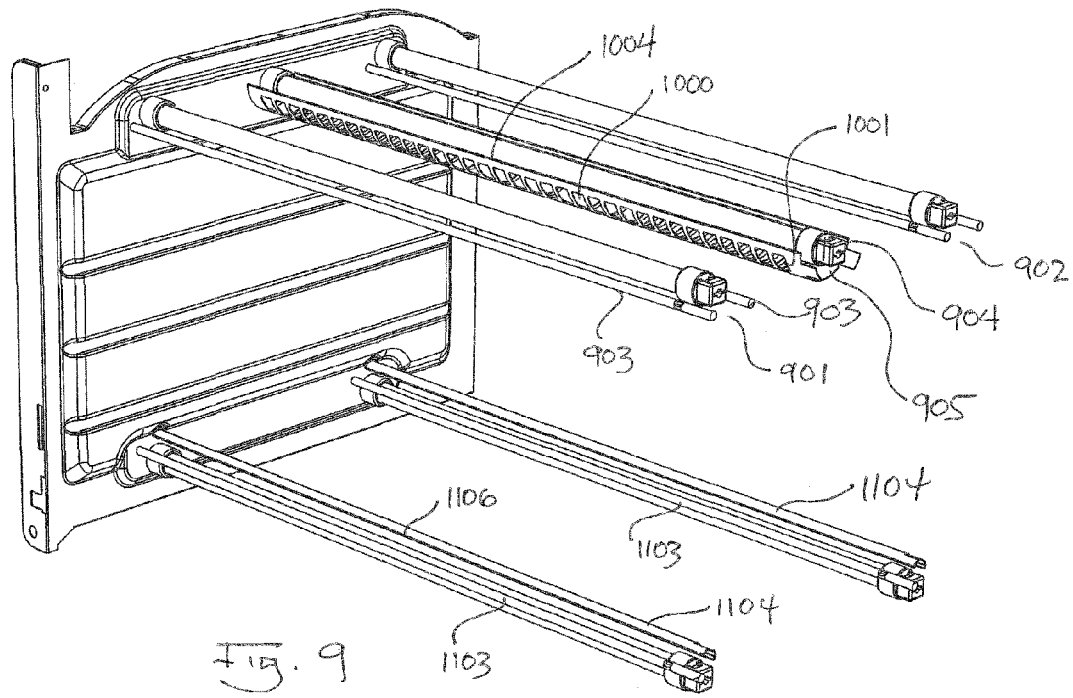
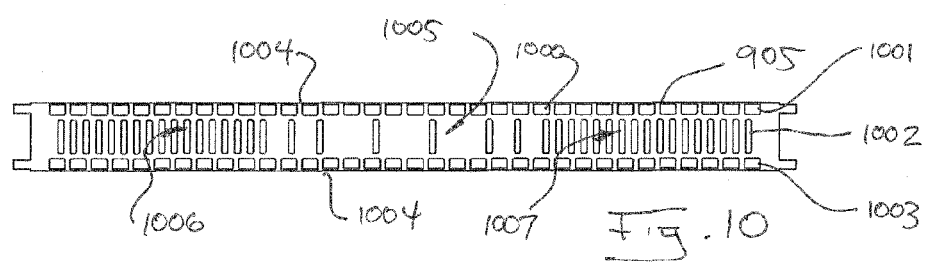
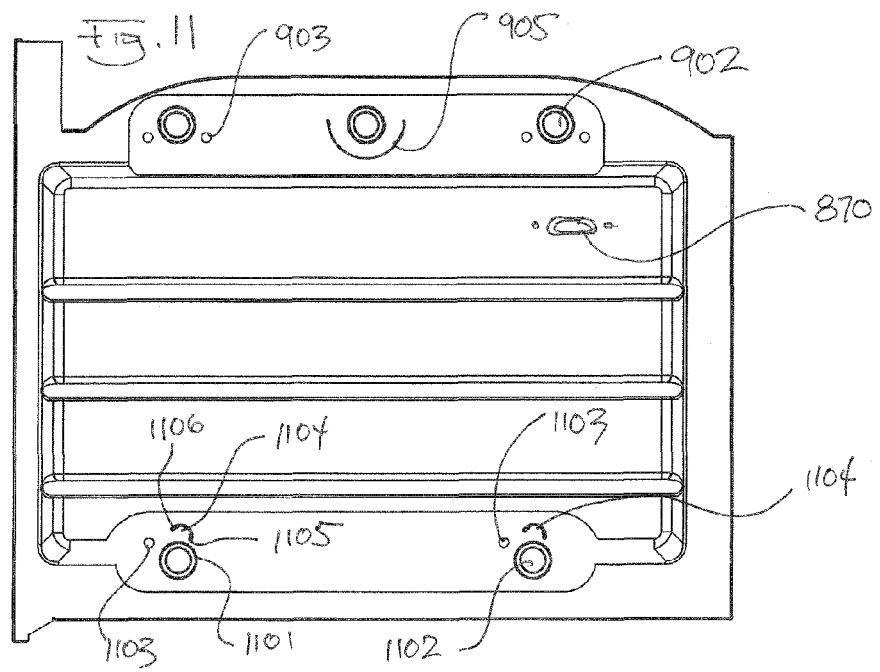

Detail of zero crossing sensor components on the PCB shown in Figure 8

US 8,669,500 B2

INTERFACE DEVICE FOR OVEN

FIELD OF THE INVENTION

The invention relates to toaster ovens and more particularly to a toaster oven with variable power heating elements and versatile user control over the operation of those heating elements.

BACKGROUND OF THE INVENTION

A toaster oven is used for a variety of cooking and food heating tasks. A toaster oven will be used, for example, for toasting a wide variety of breads (including frozen bread, bagels and pizza), baking cakes, and broiling meats (grilling).

Handling the aforementioned tasks successfully requires powerful heating elements and temperature control over these heating elements that is sophisticated and versatile. In turn, easy and versatile control over the heating elements is facilitated by a user interface that permits a user to utilise the various functions of the oven in a convenient and safe way.

Details in the construction of a toaster oven are contained in the Applicant's co-pending Australian Provisional Application No. 2008901884 which is incorporated herewith, in its entirety, by reference.

OBJECTS AND SUMMARY OF THE INVENTION

It is an object of the invention to provide a toaster oven having four or more heating elements that can be controlled to perform a variety of tasks.

It is another object of the invention to provide a toaster oven having heating elements that can be run at two or more power settings.

It is a further object of the invention to provide a toaster oven having an easy to use and intuitive user interface that clearly distinguishes between the oven's toasting functions and its other functions.

According, a toaster oven is provided with four or more heating elements. At least some of the elements are controlled in such a way that the power output of the elements can be varied.

BRIEF DESCRIPTION OF THE DRAWING FIGURES

In order that the invention be better understood, reference is now made to the following drawing figures in which:

FIG. 6 are front elevation details of the interface illustrating toast functions;

Figure 8A:
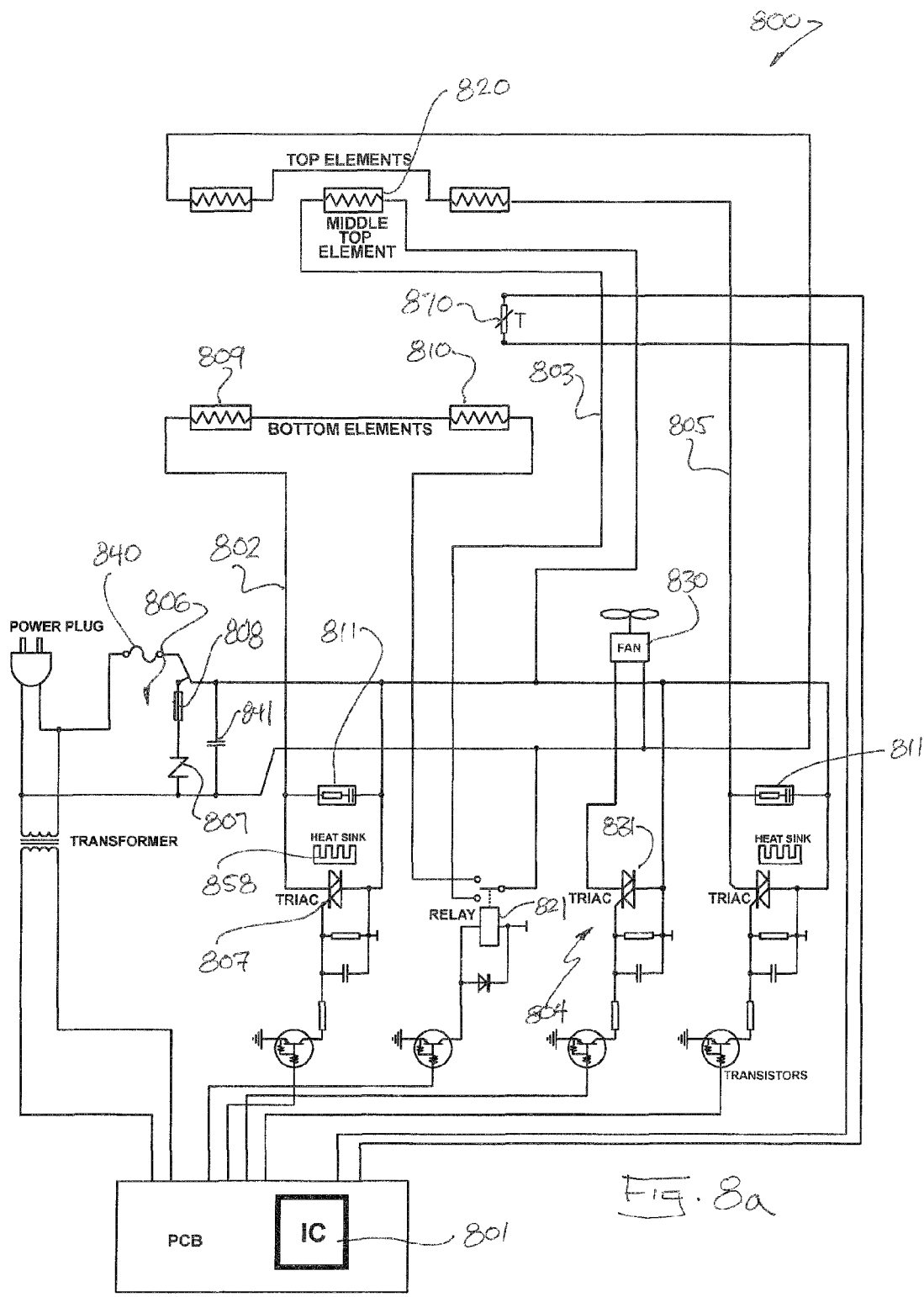
Figure 8B:
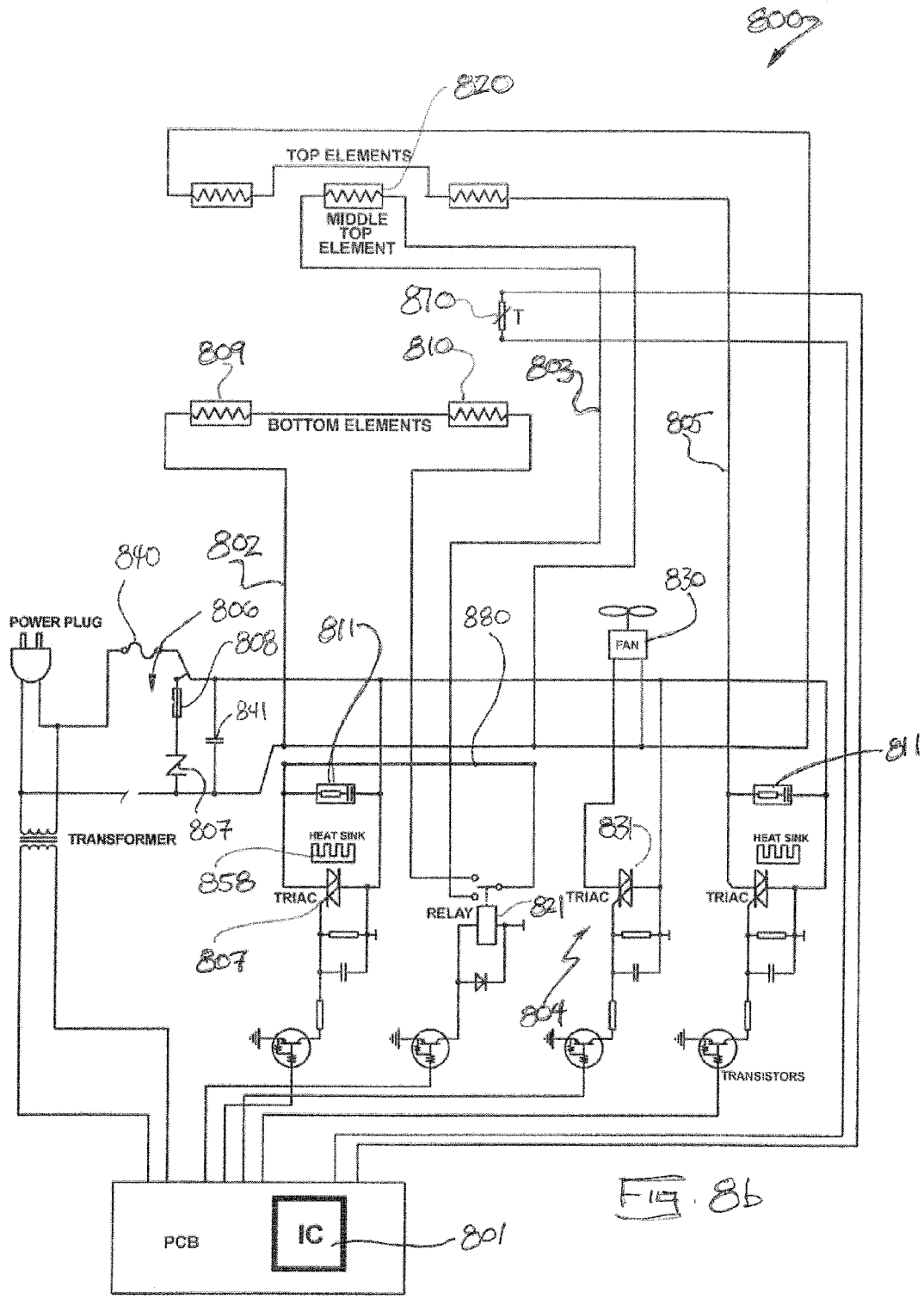
Figure 12:
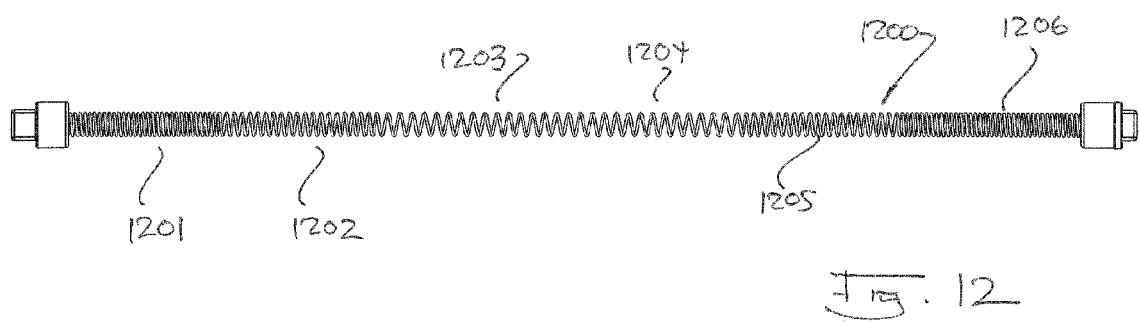
Figure 13:
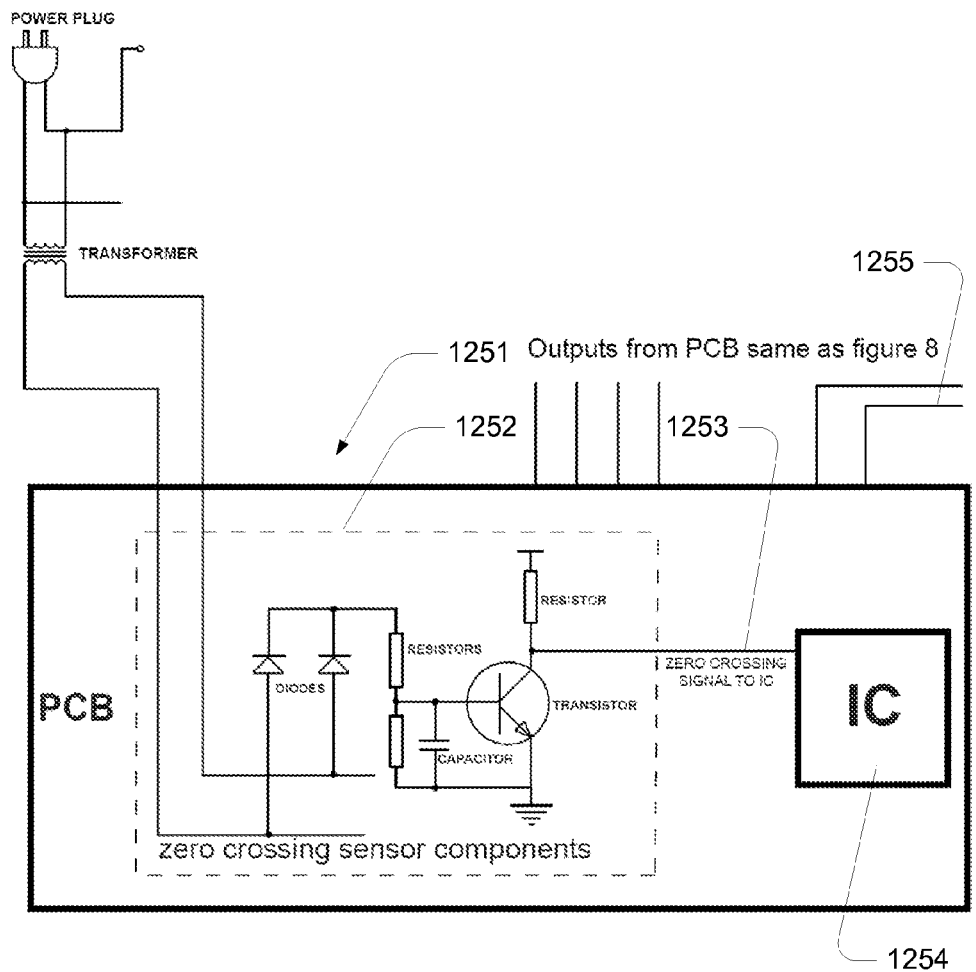
Figure 14A:
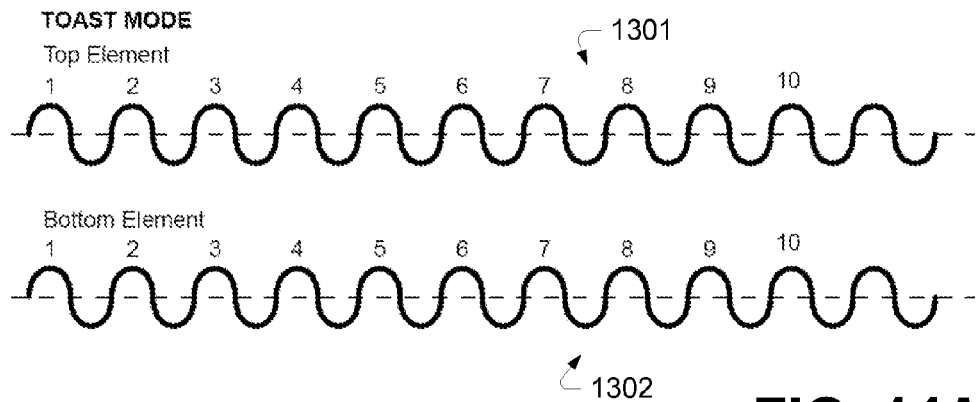
Figure 14B:
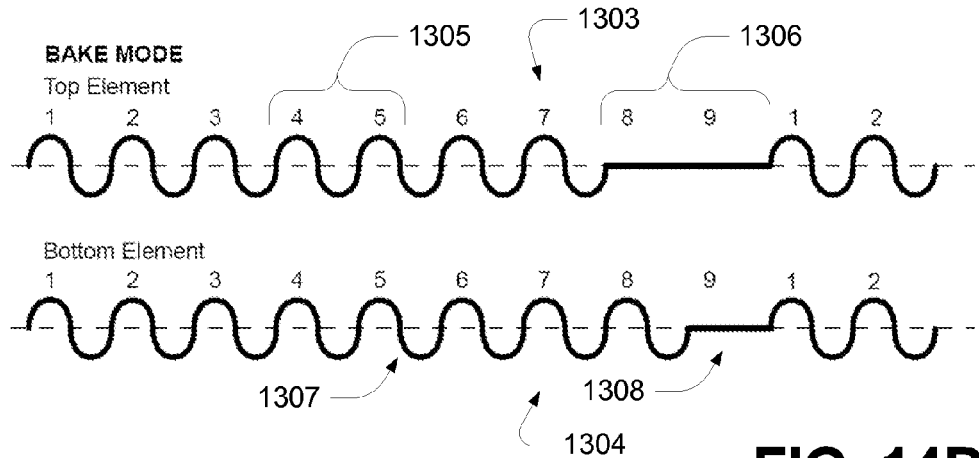
Figure 14C:
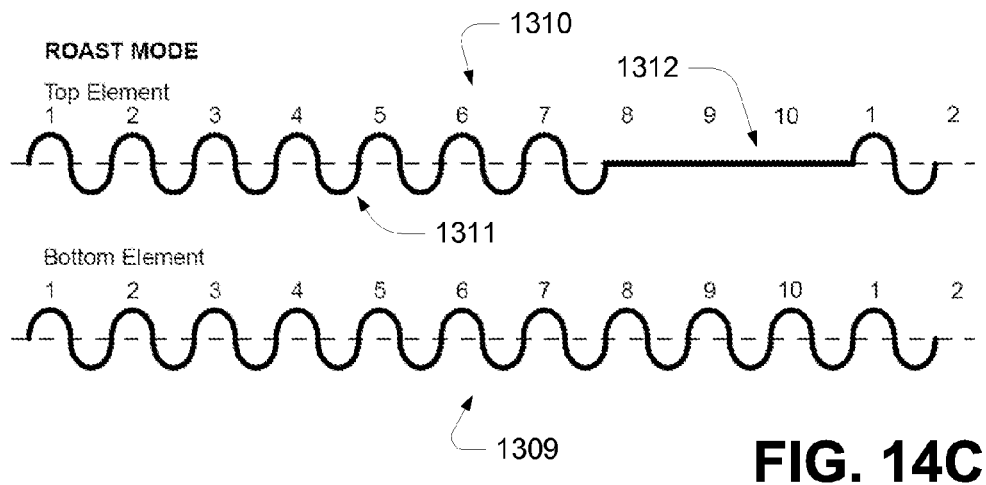
Figure 14D:
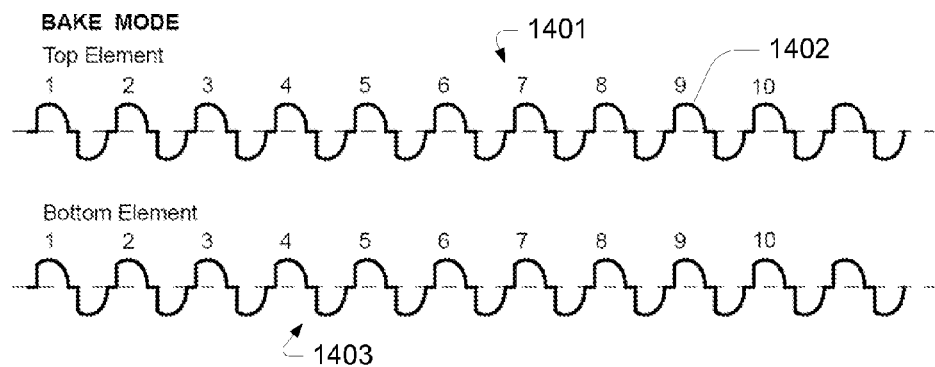
Figure 14E:
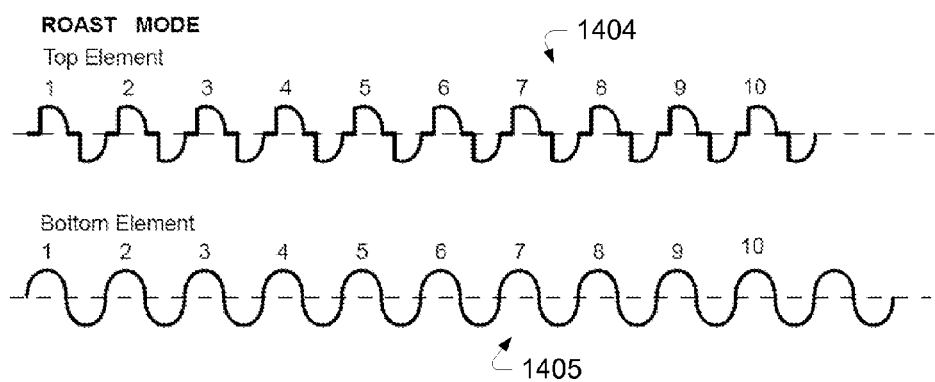
Figure 16:
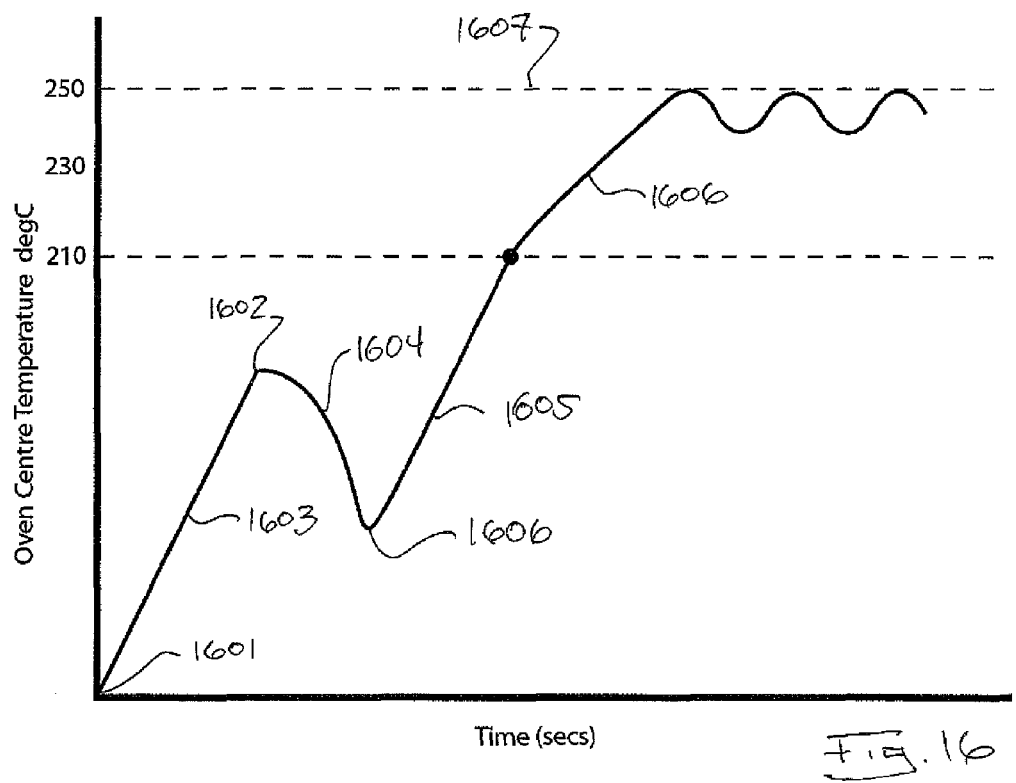
Figure 15:
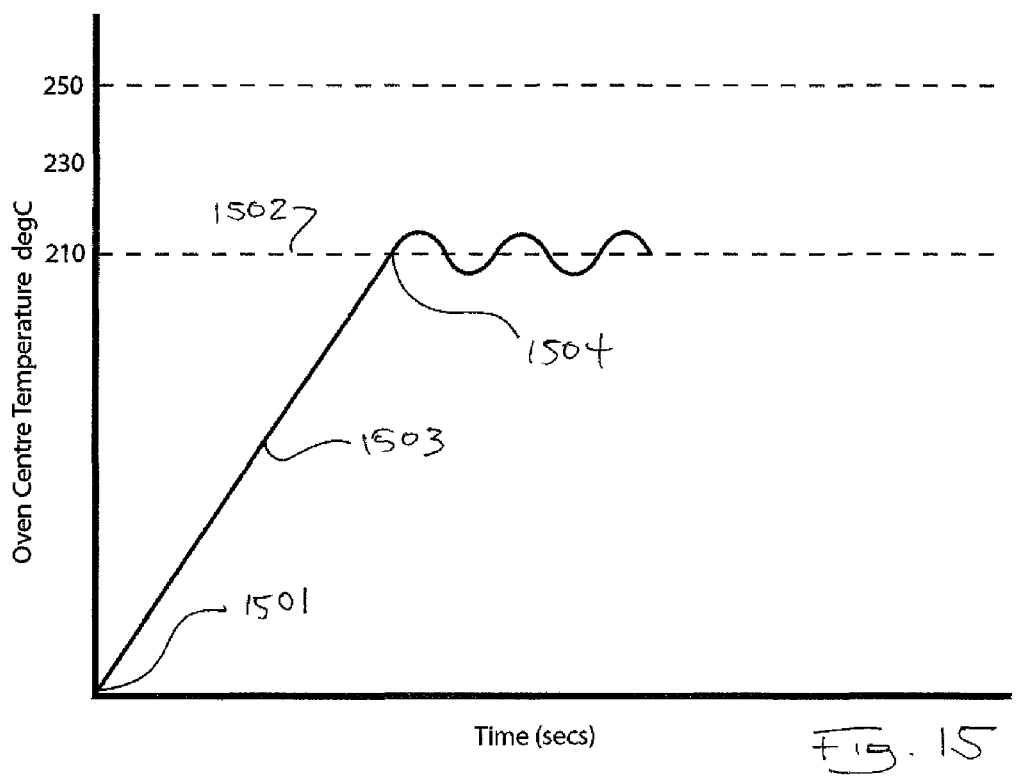
Figure 17:
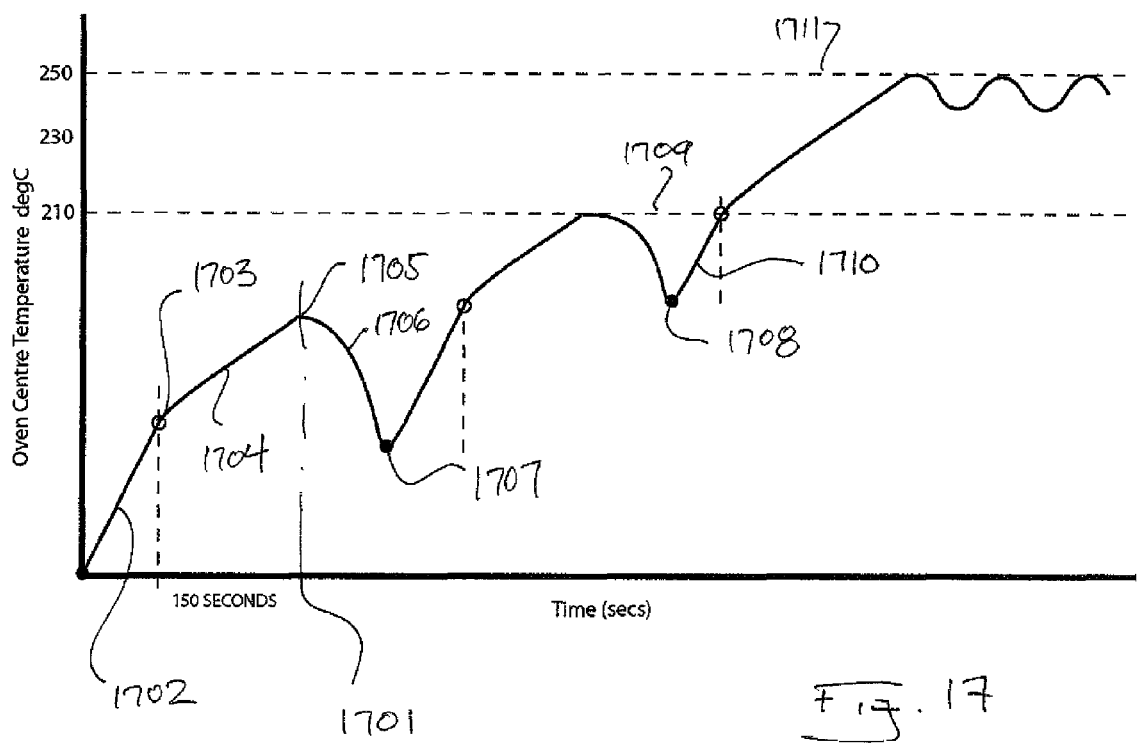

FIG. 8*a* is a schematic circuit diagram of a toaster oven in accordance with the teachings of the present invention;

FIG. 8*b* is another schematic circuit diagram of a toaster oven in accordance with the teachings of the present invention;

FIG. 9 is a perspective detail of the arrangement of the oven's five heating elements;

FIG. 10 is an underside plan view of the top middle element's shield;

FIG. 11 is a side view of the arrangement depicted in FIG. 9;

FIG. 12 is an embodiment heating element;

FIG. 13 is a detailed schematic diagram of the printed circuit board depicted in FIG. 8;

FIGS. 14A, 14B, and 14C are schematic diagrams of the cycles of AC power delivered to the elements in an oven according to the teachings of the present invention;

FIGS. 14D and 14E are schematic diagrams illustrating alternative AC wave shapes;

FIG. 15 is a graph illustrating oven temperature over a duration associated with a bake mode;

FIG. 16 is a graph illustrating oven temperature over a duration associated with toast mode cycles; and FIG. 17 is a graph illustrating oven temperature over a duration associated with several bagel mode cycles.

BEST MODE AND OTHER EMBODIMENTS

Figure 1:
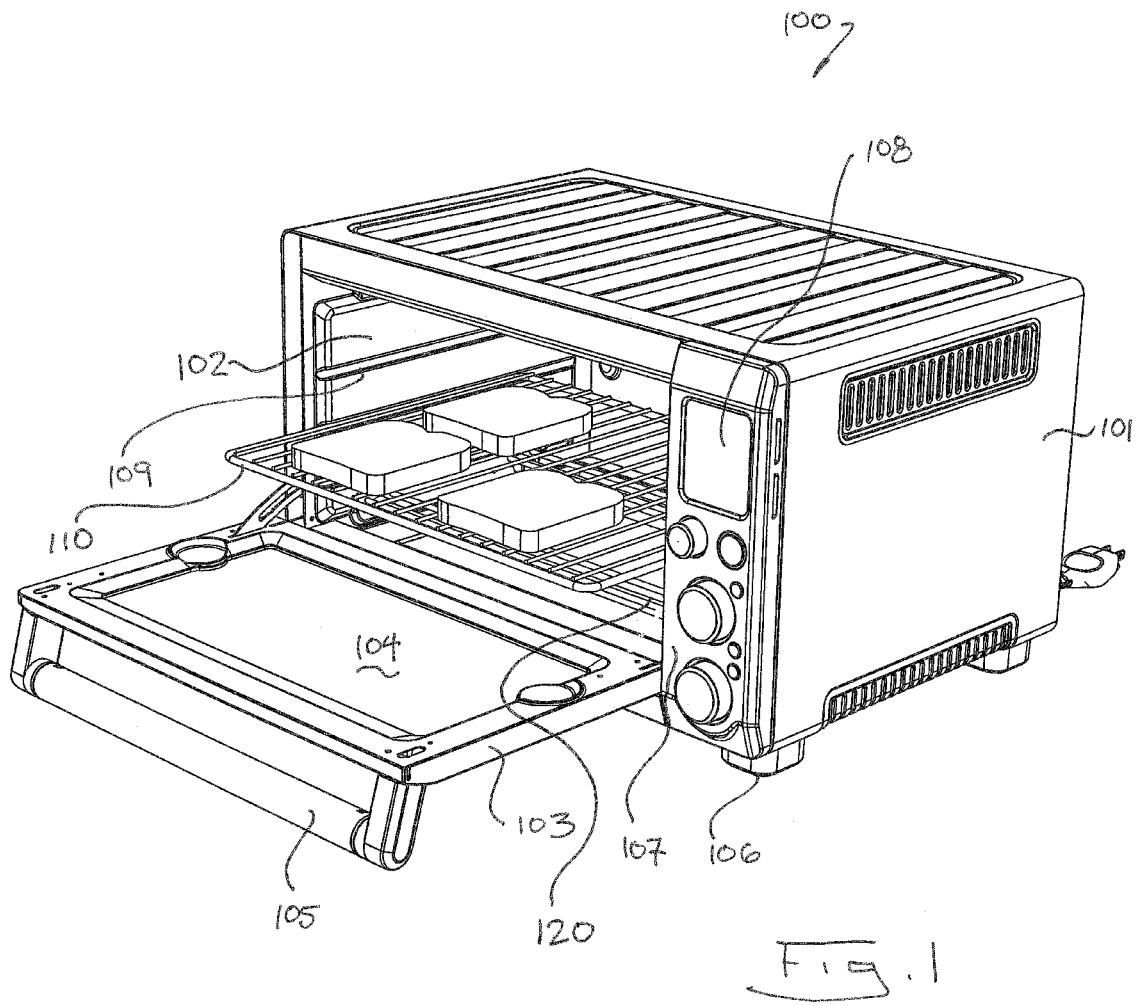
FIG. 1 is a perspective view of a toaster oven in accordance with the teachings of the present invention.

As shown in FIG. 1, a toaster oven 100 comprises a thermally insulated housing 101 that defines an internal heating compartment 102. In this embodiment, the compartment 102 is accessed through a door 103 with a transparent front panel 104. The door 103 is hinged, horizontally, along its lower edge to a lower margin of the compartment 102. The door's handle 105 is adapted to support the door, when it is fully open, on the same horizontal surface that the oven's legs 106 rest on. A vertical panel 107 on a front surface of the housing and adjacent to the door 103 provides a user interface comprising a graphic display 108 and a number of user controls, as will be discussed below. The internal compartment further comprises three opposing pairs of fixtures 109 for supporting the one or more removable racks 110. Details in the construction of a toaster oven are contained in the Applicant's co-pending Australian Provisional Application No. 2008901884 (PCT/AU2009/000465) which is incorporated herewith in its entirety, by reference.

In the embodiment depicted in FIG. 1, the internal compartment 102 is heated by five quartz heating elements 120. As will be explained, three of the quartz heating elements 120 are located adjacent to the ceiling or top of the compartment 102 and two of the elements are located along the floor or bottom of the compartment 102. In this specification we refer to quartz heating elements, but it will be noted that the invention can use many types of heating element including stainless steel calrod, tungsten, halogen etc.

For toasting and where maximum power is desired, an element or combination of all or some elements may be run at its full capacity. When, for example, baking or warming temperatures are required, an element or combination of some or all elements need to deliver lower power in a way that is consistent with the needs of e.g. baking. The present technology is adapted to deliver, at a macroscopic level (one that can be sensed by a person, e.g. seen or felt) intermediate power. This means the technology creates, for at least a period of time that can be observed by a user, an appearance of a continuous power level that is somewhere between full and off. This is to be distinguished from other oven element powering configurations where an element is cycled or turned on and off from full power to no power throughout a cooking cycle. This common prior art method achieves a form of intermediate heating, but the quality of e.g. baked goods suffers because of the intensity of the full power portion of the cooking cycle. The prior art form of intermediate heating also produces undesirable thermal overshooting of the desired target temperature. In particularly preferred embodiments, the gentle, continuous, even heating preferred by bakers (for example in the baking of cakes) can be achieved throughout all (or a significant or visible portion of) a cooking time by reducing the amplitude of or "chopping" the AC wave form, or by omitting or deleting or suppressing cycles of the AC waveform of the power supplied to the heating elements, using triacs or cycling relays or other electronic components in the circuitry associated with some or all heating elements (but not necessarily the top central element 220). In this way, at least at a macroscopic or sensory level, the element appears to be delivering what is defined here as true intermediate power, a level of heat that is, for a user appreciable time, intermediate—less that the full power output of the element but more than zero power. This true intermediate power can be combined with full power, no power and other true intermediate power settings during a cooking cycle. True intermediate power is akin to electronic dimming of the heating element, as seen in lighting devices.

Figure 2:
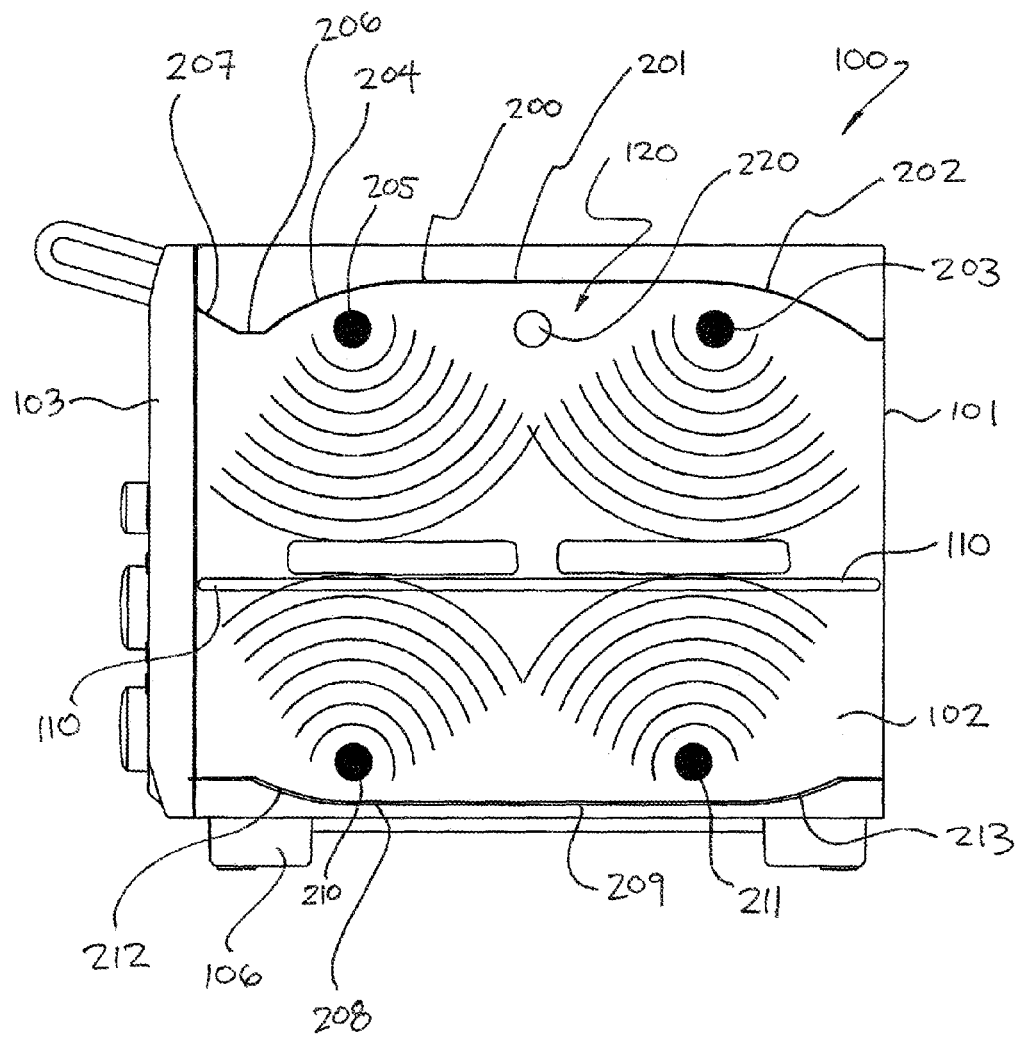
FIG. 2 is a schematic cross section of a toaster oven in a toasting configuration.

As shown in FIG. 2, the internal compartment 102 contains five quartz heating elements. The ceiling 200 of the internal compartment is configured to optimise even toasting. The central part 201 of the ceiling is relatively flat. A curvature is provided in the ceiling, both behind 202 the rear element 203 and in front of 204 the front element 205. The front curvature 204 extends downwardly toward a small flat strip 206 that is lower than the central flat area 201. A short bevelled section 207 extends across the top edge of the opening into the compartment, terminating at the strip 206. The bevelled portion 207 makes user access into the interior of the compartment easier.

FIG. 2 also illustrates that the interior floor 208 of the compartment is protected by a removable crumb tray 209. The crumb tray 209 also includes curved reflective portions in front of the front lower heating element 210 and behind the rear lower heating element 211. The crumb tray 209 is preferably flat between the forward curved reflective portion 212 and the rear curved reflective portion 213.

As will be further explained, an optimisation of the oven's versatility and performance is achieved by providing five heating elements and utilising at variable wattages according to the mode of operation. (In smaller or more economical versions of the oven of the present invention, the optional top central element may be omitted). In the present examples, the device is presumed to be running on 120 volt AC. It will be understood that values expressed in these examples, in watts, need to be adjusted accordingly when other line voltages are used. In the example provided in FIG. 2 it can be seen that the oven has a top set of three heating elements being, a top front element 205, a top central element 220 and a top rear element 203. The top front and rear elements are preferably operated in unison. In some embodiments, the top front and rear elements 205, 203 are 450 watts and the middle element 220 is 550 watts. In other embodiments, better performance is achieved by installing a 520 watt element in the top front position 205, a 380 watt element in the top rear position 203 and a 550 watt element in the top central position 220. In preferred embodiments, both of the lower heating elements 210, 211 are 450 watts and operated in unison. As will be explained, the top central element 220 and the bottom elements 210, 211 may be shielded. In particularly preferred embodiments, the lower elements and the top elements (but not necessarily the central element 220) are current controlled or regulated with triacs to further vary the thermal output of the elements. In order to address safety and regulatory concerns (and as will be explained with reference FIG. 8) it is preferably not possible to operate the oven's top central element 220 at the same time that the bottom elements 210, 211 are operated. When the top central element 220 is on, both lower elements 210, 211 are off. When the lower elements 210, 211 are on, the top central element 220 is off.

Toast Configuration

As shown in FIG. 2, uniform toasting of a wide variety of breads is achieved quickly by utilising four of the five heating elements 121.

In the example of FIG. 2, all of the oven's elements are on except for the top central element 220. The other four elements 205, 203, 210, 211 are operated at their maximum wattage. This produces the maximum glowing radiation for effective toasting. When used as a toaster, the oven's rack 110 is located in the middle position. As suggested by FIG. 5, instructions for using the rack in the middle position are printed on or adjacent to a corresponding location 501 on the oven's door.

In preferred embodiments the toaster oven uses the maximum available wattage, limited by local regulatory or power limitations. In the US and Canada this is 1800 watts of power, shared equally between the top and bottom elements. In Australia this is 2400 watts.

Bake Configuration

Figure 3:
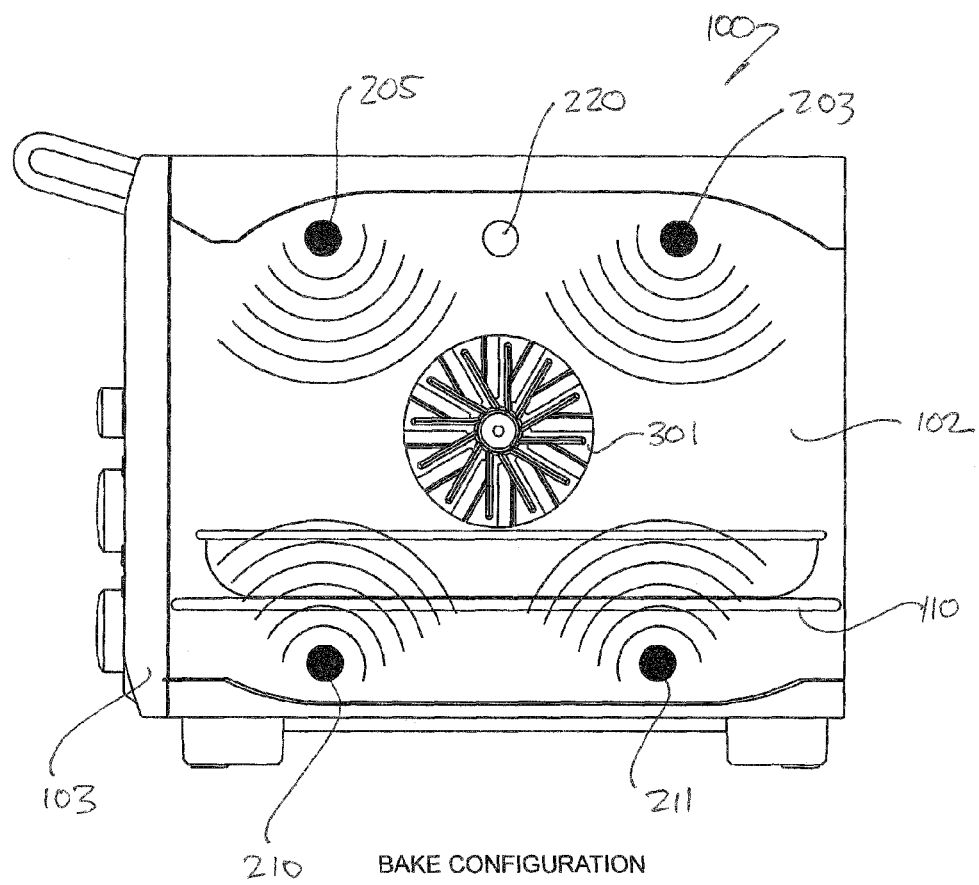
FIG. 3 is a schematic cross section of a toaster oven in a bake configuration.

As shown in FIG. 3, the toaster oven 100 may be used as an oven or convection oven. When used as an oven, the top central heating element 220 is not used but other heating elements 205, 203, 210, 211 are. In this configuration or mode, the rack no is preferably located in the lowest rack setting. The motorized convention fan 301 is preferably set to a default state of "on" although it may be defeated according to the operation of the user controls on the control panel 107. In particularly preferred embodiments, the gentle heating preferred by bakers (for example in the baking of cakes) can be achieved by reducing the amplitude of or "chopping" the AC wave form, or by omitting or deleting or suppressing cycles of the AC waveform of the power supplied to the heating elements, using triacs or cycling relays or other electronic components in the circuitry associated with both of the top and bottom heating elements (but not necessarily the top central element 220). This form of true intermediate power can be used continuously through a cooking cycle or used intermittently with another true intermediate or zero power interval or combined with, for example, a pre-heating portion of a cooking cycle using full power for an initial time, to bring the oven up to the correct cooking temperature.

Broil or Grill Configuration

Figure 4:
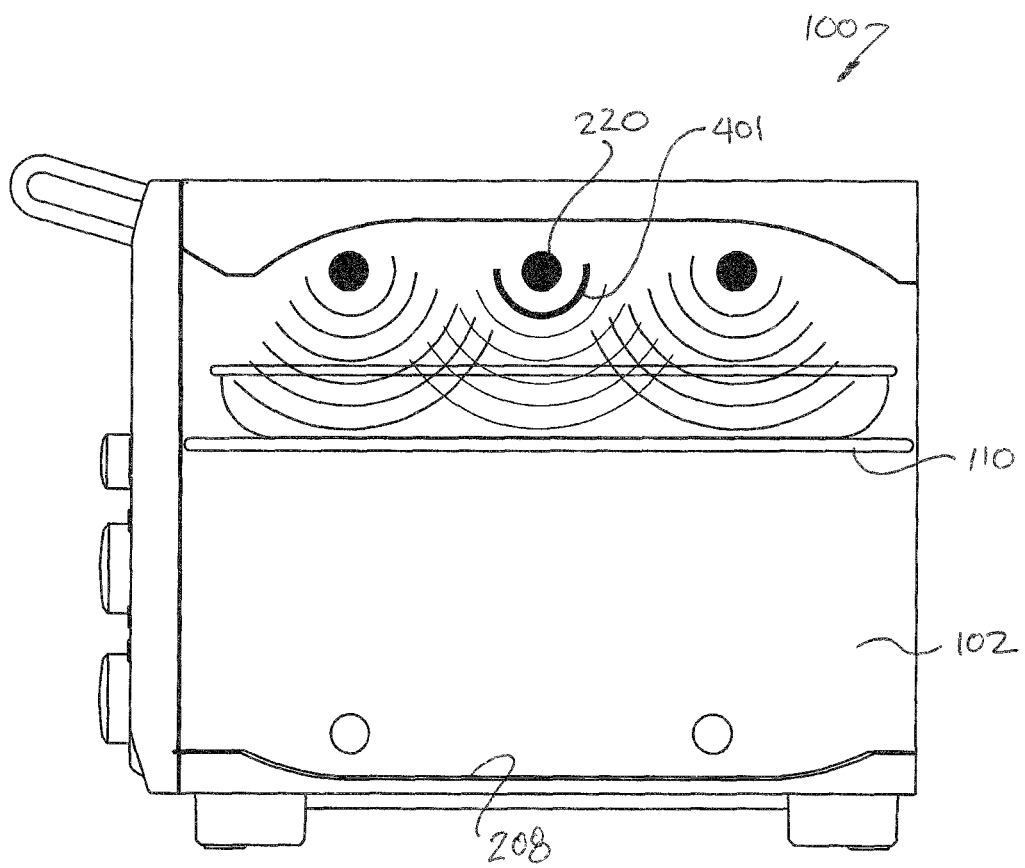
FIG. 4 is a schematic cross section oven in a broil configuration.

As shown in FIG. 4, the toaster oven 100 of the present invention may be used as a broiling or grilling device. In this configuration or mode, the rack 110 is preferably located in the uppermost position within the cavity 102. When the grilling or broiling cycle is selected by a user, all three top elements are used, preferably at their full power setting. However, any and all top element can be triac controlled, in unison, to provide more precise power delivery. As previously mentioned, the top central element may be omitted in smaller or more economical embodiments. As will be further explained, it is preferred that the top central element 220 (if present) be shielded. Accordingly, a perforated metal shield 401, is interposed between the element 220 and the food below it. In preferred embodiments, the rack 110 is higher in the broil position than in the toast position. The utilisation of three heating elements above the rack assists in providing an even spread of heat. With only two elements, the oven would have a cool spot toward the middle of the rack. The utilisation of the third element 220 enables the delivery of an even heat. The use of the perforated shield allows some direct radiation to pass through it. In special cooking configurations or modes such as for melting cheese on toast, the intensity of the elements, particularly the forward and rear upper elements can be reduced by using triacs and the supply of true intermediate power (as previously explained) so that, for example, the toast doesn't burn before the cheese is melted. Further details concerning the various cooking modes will be provided below.

User Interface

A user interface panel 107 is provided on the front of the toaster oven 100. The user interface panel further comprises a graphic display area 502 and various user operable controls 503. In preferred embodiments, the user controls are located directly below the graphics display 502.

Figure 5:
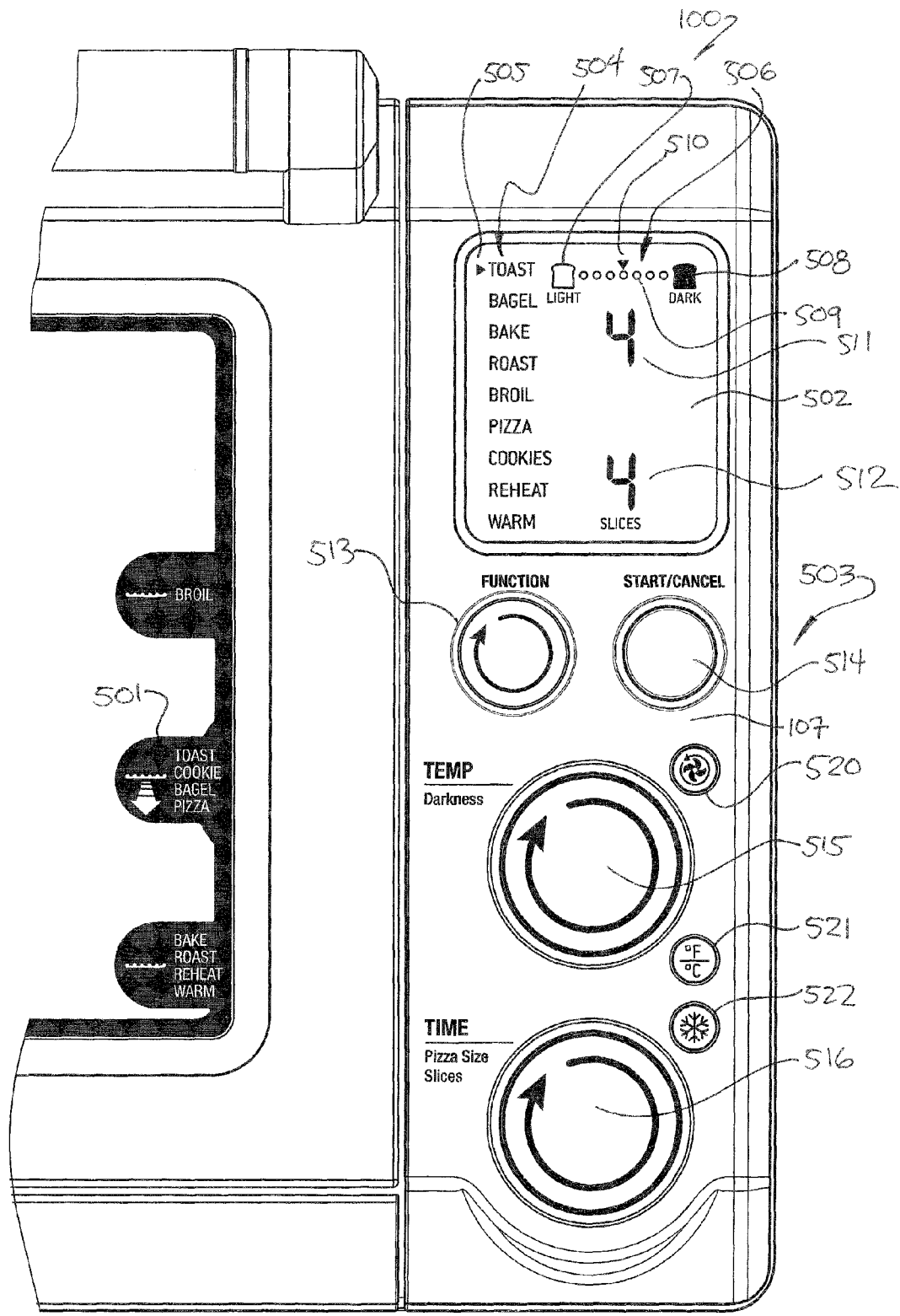
FIG. 5 is a front elevation detail of a toaster oven showing a user interface and oven door details.

The graphics display area 502 comprises a vertically arranged list of cooking modes 504 and a moving arrow or indicator 505 that tells the user which mode has been selected. In the example of FIG. 5, the modes include toast, bagel, bake, roast, broil, pizza, cookies, re-heat and warm. The various modes and their functions will be explained below. The graphics display area 502 also comprises a toast shade selection indicator 506. The indicator 506 shows schematic representations of toasted bread, one light 507 and one dark 508. The user selections are, in this example, seven in number and small icons 509 in conjunction with a moving arrow or indicator 510 provide visual feedback to the user of the selected toast shade. The display area 502 further comprises an upper alphanumeric portion 511 and a lower alphanumeric portion 512. The upper alphanumeric portion 511 is used to indicate, for example, a numeric value of the toast shade selected by the user (when the toast mode has been selected) or, an oven temperature (for example when the bake function has been selected). The lower alphanumeric portion 512 can be used to indicate the number of slices of bread that the user has selected (when the toast mode has been user designated), a pizza size, or the time remaining in a cooking cycle (for example when the bake mode has been user selected).

The user operable controls 503 provide the user with an easy way to make selections or preferences, and provide inputs to the oven's processor in respect of the various modes and user preferences within modes. Importantly, the primary modes designated in the vertical list 504 are selectable by a rotary dial 513 which is located in vertical alignment and preferably below the list 504. Rotation of the mode dial 513 changes the oven's functionality and the selected mode is indicated by the moving arrow 505. In this example, the start/cancel button 514 is located directly below the display area 502 and adjacent to the mode dial 513. The mode dial 513 allows the user to select one of a number of different modes or functions. However, within each of these modes, the user is able to express various preferences. Thus, the two largest rotary selection dials are the temperature/darkness control dial 515 and below it, a time/load size dial 516. The upper dial 515 allows the user to adjust the cooking temperature, for example, adjusting the default temperature associated with any particular mode upward or downward. This same dial 515 allows a user to select the selected shade or darkness of toast when the unit is in a toast mode. When the toast mode has been selected with the dial 513, rotation of the upper or temperature/darkness selecting control 515 results in the appropriate movement of the arrow or indicator 510. Rotation of the lower or time/load size control 516 allows the user to adjust, before or at the inception of a cooking cycle or during it, a selected time or the default time specified by the unit's microprocessor. However, when the user selected function is the pizza or toast function, rotation of the time/load size dial 516 results in commensurate changes to the lower alphanumeric indicator 512 that relate to load size, such as number of slices or pizza size. In preferred embodiments, the temperature/darkness dial 515 and the time/load size 516 are of equal size and located in proximity. Both may be operated during a cooking cycle so as to make adjustment mid-cycle. The interface panel 107 also includes a button or control 520 for the user selection or de-selection of the convection fan feature. The convection fan feature preference is only available in certain modes. The interface panel 107 also includes a control or button 521 that allows the user to toggle any displayed temperature from Fahrenheit to centigrade or centigrade to Fahrenheit. A frozen food control or button 522 is also provided. As will be explained, selection of the frozen food preference allows the total cooking time to account for frozen foods (when this feature is enabled in a mode).

Examples of the way information is displayed in the graphics display area 502 are depicted in FIGS. 5 and 6. As shown in FIG. 6, the function list 504 in conjunction with the indicator 505 show the user that the toast mode has been selected. The upper alphanumeric area 511 in conjunction with the symbolic display 506 indicates that the user has selected a darkness or shade of 4. The lower alphanumeric area 512 indicates that the user has selected four slices using the time/load size dial 516. Once the mode and preferences have been established, the user presses the start/cancel button 514 and the display changes accordingly. The resulting display, particularly the lower alphanumeric display area 512 displays the remaining cooking time 601 rather than the number of slices that have been selected. If the user had also selected the frozen food control button 522 the lower alpha numeric display area 602 would show the user that more time had been added to the toasting cycle. A graphic icon and the word "frozen" 605 within the display area 502 also provide feedback to the user that the frozen food preference had been selected by use of the frozen food control or button 522.

Figure 7:
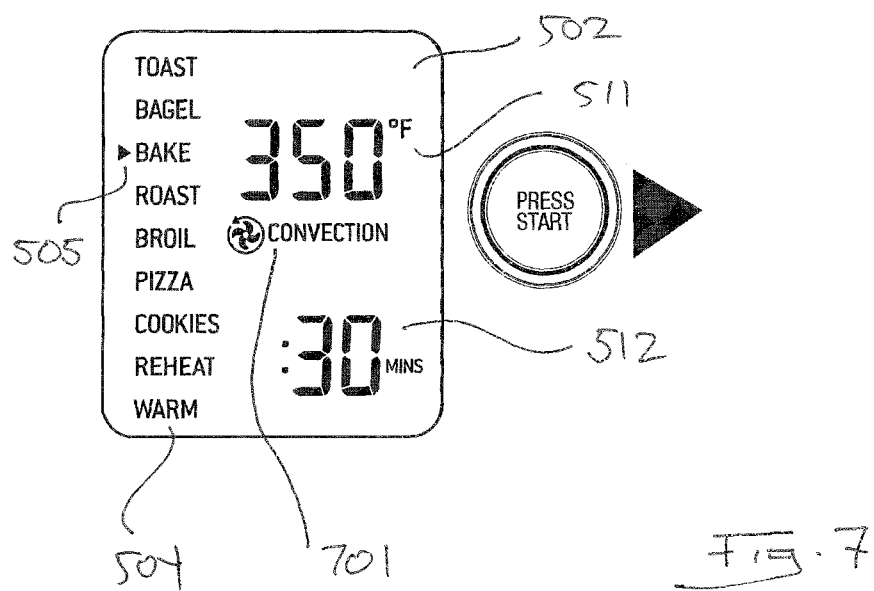
FIG. 7 is a front elevation detail of a portion of the interface illustrating bake functions.

As shown in FIG. 7, when the user selected bake mode has been requested, the default temperature of 350 degrees Fahrenheit is displayed in the upper alphanumeric display area 511 and a default time, e.g. 30 minutes is displayed in the lower area 512. In preferred embodiments, utilisation of the bake function results in a default selection of the convection feature and the same is indicated within the display area by an icon and/or text 701.

Circuitry

FIGS. 8a and 8b show typical schematic circuit diagrams 800 for implementation of the electronic control of the elements and fan. In this example, the oven's functions are controlled by an integrated circuit 801. In this example, separate sub-circuits are provided for both of the bottom elements 802, the middle top element 803, the fan 804 and the front and rear top elements 805. An overload or storm protection sub-circuit 806 is provided across the input power leads. The sub-circuit 806 includes an optional thermal fuse 840, a noise filter capacitor 841, a varistor 807 to absorb power surges and a PCB fuse 808 as a back-up against the failure of the varistor 807. In the sub-circuit 802 associated with the bottom elements, a triac 807 is protected by a heat sink 858. The triac is used as an electronic relay and current controller (e.g. for delivering true intermediate power) in the control and regulation of both of the bottom heating elements 809, 810. A resistor and capacitor 811, in series, and located across the outputs of the triac 807 absorb high frequency noise that may be produced from the operation of the triac. The triac 807 can be used to switch the bottom elements on and off as well as regulating their current draw and thermal output with methods such as "chopping" or suppressing the AC wave form, many times a second (for true intermediate power, or otherwise) to reduce the effective or average wattage, as required. The sub-circuit 805 for the top elements is similar to the sub-circuit for the bottom elements 802. The sub-circuit 803 for the middle top element 820, in this embodiment does not use a triac, but it may. Instead or as well as a triac or other current regulator, it uses a relay 821 so as to create a toggling between the operation of the top middle element and the pair of bottom elements 809, 810. Thus, it becomes impossible (in this configuration) to operate both the middle top element 802 and the bottom elements 809, 810 together. This optional toggling feature eliminates the need for a current fuse. The e.g. 20-60 watt fan 830 for the convention feature is operated with a triac 831 but does not require a high frequency noise filter.

A thermistor 870 located in the oven provides temperature feed back information to the processor 801. Thus the processor can compensate or adjust (by reduction) the time calculated to cook based on the internal oven temperature of the oven at the time when the Start button 514 is pressed. This happens for automatic functions such as Toast, Bagel, and Pizza as will be explained. The thermistor 870 is preferably located behind a thin aluminium pressed shell or bubble at an upper portion of the back or sides of the oven, and is embedded in heat-sink paste.

An alternative circuit is depicted in FIG. 8*b*. In this example, a single triac 807 or other current regulating device is used to control either the top middle element or the bottom elements. This is done by routing the regulated output 880 of the triac 807 to the relay 821. Thus operation of the relay delivers the regulated output to either the bottom elements 809, 810 or the top middle element 820 (but not both the bottom elements and the top middle element).

Elements and Shielding

As shown in FIG. 9, each of the oven's five quartz heating elements is protected from accidental breakage. For example, the front and back top elements are located between and above a pair of stainless steel rods 903. The top middle element 904 is physically protected by a radiation shield 905. The shield 905 is formed from metal and is shaped as a generally "U" shaped or arcuate channel. As better shown in FIG. 10, various perforations 1000 are provided along the length of the shield 905. The perforations woo are provided in three longitudinal rows 1001, 1002 and 1003. The rows 1001, 1003 along the edges 1004 of the shield are generally equally spaced and equally sized and provide only modest blocking of the intense radiant energy emitted by the heating element. In the example of FIG. 10, the perforations of the middle row 1002 are equally sized but irregularly spaced. The centre group 1005 of perforations are further apart when approaching the centre of the shield. The middle row's outer perforations 1006, 1007 are spaced together more closely than the middle perforations 1005 and are preferably evenly spaced. Thus, the central portion of the heating element is more shielded than the ends. This prevents a formation of a hot spot underneath the middle of the top middle element 905.

Because of the combined effects of the radiant and convection output of the lower elements, special shielding has been devised to provide physical protection of the elements in combination with the elimination of hot spots associated with the lower elements. As shown in FIG. 11, the lower heating elements 1101, 1102 are both located below and laterally of an adjacent stainless steel rod 1103. In addition, the lower elements 1101, 1102 are physically protected by an inverted "U" shaped, unperforated shield 1104. In this example, the shield 1104 of the lower elements is located above and within the upward projected diameter of each element. The shields 1104 are canted so that one lower back or rear side edge 1105 is closer to the adjacent element than an upper front side edge 1106.

It will be appreciated that within the confines of a relatively small oven compartment, a heating element that produces uniform heat across its length will produce a distribution of temperature within the compartment that is uneven. Particularly with regard to shorter cooking times, operation of a uniform heating element will produce a temperature in the middle of the oven that is hotter than the temperature close to the side walls. This dilemma may be addressed by varying the pitch or spacing of the coils within the quartz heating element in the manner disclosed by FIG. 12. As shown in that figure, a quartz heating element's internal coil 1200 may contain, along its length, regions of different pitch or turn spacing. In the example of FIG. 12, the length of the coil 1200 can be thought of as having been subdivided into six portions of generally equal length 1201, 1202, 1203, 1204, 1205 and 1206. The outer most portions 1201, 1206 have the smallest or finest pitch (tightest spacing between adjacent turns). The central two portions 1203, 1204 have the greatest spacing between adjacent turns and may have equal pitches. The intermediate portions 1202, 1205 having turn spacing that is closer than the central portions 1203, 1204 but farther (greater or coarser pitch) than the outer portions 1201, 1206.

Further Discussion of the Toaster Oven's Modes

Toast Mode

The toast mode is user selectable with the mode dial 513. The toast mode is intended to be used with the rack 110 in the middle position. In preferred embodiments, the top middle element 220 is not used but the other elements are. The fan is not used and full power (preferably 1800 watts or 2400 W where allowed by local authorities) is delivered to the remaining four elements. The time/load size dial 516 can be used to receive a user preference of between 1 and 6 slices. The default setting is preferably four slices. Using the aforementioned wattage, toasting times vary between about 165 seconds for 1 slice (at the lowest browning setting) to about 420 seconds (for six slices at the maximum browning setting). The convection feature is turned off and the circuitry does not allow the user to activate the convection feature. When the frozen food function is selected with the frozen food button 522 extra time is added to the normal cycle time. By way of example, fifteen seconds is added for one or two slices. Twenty seconds is added for three slices or four slices. Thirty seconds is added for five slices and thirty five seconds is added for six slices.

The thermistor 870 in the oven may provide oven temperature feed back information that allows the processor 801 to compensate for the internal temperature of the oven, by reducing the cooking time as required.

Bagel Mode

When the bagel function has been selected, the cooking cycle is subdivided. A first portion of the cooking cycle (e.g. two minutes and 30 seconds) is cooked using 1800 watts of power. Thereafter, the power is reduced, for example, to 1450 watts. In the first portion of the cycle, all of the elements are used except for the top middle element. Thereafter, all of three top elements are used but the bottom elements are not used. In the bagel mode, the defaults are four slices and a browning setting of 4 (out of 7). Cooking times vary from about 205 seconds (for one bagel half at the lowest setting) to about 375 seconds (for six bagel halves at the highest browning setting). When the frozen food preference is selected, extra time is added to the normal cooking time. For example, 25 seconds is added for one bagel half and an additional five seconds is added for each additional half, resulting in an additional 50 seconds when six slices or bagel halves are selected. When using the bagel function, the convection feature preferably deactivated and prevented from being selected. The thermistor 870 in the oven may provide oven temperature feed back information that allows the processor 801 to compensate for the internal temperature of the oven, by reducing the cooking time as required.

Bake Mode

The maximum cooking time when the bake mode has been selected is about 2 hours. In the bake mode, the convection fan default is "on". The top middle element is preferably "off" and a total power of about 1440 watts is delivered evenly to the other four elements. Because the convection fan is generally "on", the total power consumption may reach 1500 watts. In the bake mode, the default temperature is 350 Fahrenheit (optionally delivered at least in part by true intermediate power) and the default cooking time is 30 minutes. Both of these values may be subsequently adjusted by the user, even in mid-cycle. In the bake mode, the frozen food selector control may be disabled and the displayed symbol 605 may be caused to flash to indicate than an improper selection has been made. In some embodiments, the delivery of power may be biased toward the bottom elements for all or a portion of the cooking cycle. When the Start button is pressed in Bake mode, the oven preheats until the selected temperature has been reached. PREHEATING flashes on the display, and an audible sound then indicates that the oven has reached the selected temperature, and the timer starts to count down automatically.

Roast Mode

When the roast mode has been selected, power is preferably delivered evenly to all of the heating elements except for the top middle which is off. When the Start button is pressed in the Roast mode, the oven preheats until the selected temperature has been reached. PREHEATING flashes on the display, and an audible sound then indicates that the oven has reached the selected temperature, and the timer starts to count down automatically. The power delivery to the elements 1440 watts and utilisation of the 60 watt convection fan results in a total power consumption of about 1500 watts. Power may be biased toward the bottom elements during all or a part of the cooking cycle. In the roast mode, the default temperature is 350 degrees Fahrenheit (optionally delivered at least in part by true intermediate power) and the default roasting time is 60 minutes. Both of these values may be adjusted by the user pre or mid-cycle. The maximum time permitted in the roast mode is two hours. In the roast mode, the frozen food function is disabled and the display symbol 605 may be caused to flash so as to indicate that an improper selection has been made. In preferred embodiments, the default for the convection fan is "on".

Broil Mode

Three different broil preferences may be set using the temperature/darkness dial 515. If the user sets the broil to (e.g.) 300 degrees Fahrenheit, power delivery to the top front and top rear elements is set to about 310 watts each. The top middle element will be cycled with the triac or relay to achieve an average of about 380 watts. This results in an overall power delivery of about woo watts. The default time is set to 15 minutes with a maximum time of 20 minutes. The frozen food preference control is disabled. The default for the convection feature is "off" but a user can use the convection control 520 to activate it. Cooking times are not adjusted by the microprocessor if the convection feature is selected.

If the user sets the broil setting of (e.g.)400 Fahrenheit using the temperature/darkness control 515, only the top elements are used. The front and back elements are powered to 390 watts and the top middle element is cycled to achieve an average power of 470 watts. This results in an average power delivery of 1250 watts. The default cooking time is 15 minutes with a maximum time of 20 minutes. The frozen food and convection features operate the same as when the user sets the broil to 300 Fahrenheit.

The user may also select a third discreet broil temperature of (e.g.)450 or 500 degrees Fahrenheit. Thus, it will be appreciated that the user is effectively presented with three broil settings, effectively being low broil, medium broil and high broil, each designated by a different display of temperature. The display can be configured accordingly to display e.g. Low, Medium or High instead of a specific temperature. In the high broil setting, all three top elements are used and each is used to its maximum power rating. The bottom elements are not used. The total power delivery is thus about 1450 watts. The default and maximum times, frozen food and convection features are handled in the same way as the other broil settings.

Pizza Mode

When the pizza mode has been selected, the user can select a number of different pizza sizes (diameters) using the time/load size dial 516. For example, a user may be able to select from 6 inch, 8 inch, 10 inch, 12 inch or 13 inch pizza sizes. The 12 inch size is the preferred default. The default cooking time for the 12 inch default pizza is 15 minutes with no oven preheating. Cooking times vary, for example, from 12 minutes for a six inch pizza through to 15 minutes, 30 seconds for a 13 inch pizza. The frozen food setting default is "on" for pizza. If the user elects to disable the frozen food setting by pressing the frozen food button 522, the cooking time is adjusted downward, for example, by two minutes. In the pizza mode, the convection default is "on". When in the pizza mode, the top middle element is off but the other elements are on and powered equally. In preferred embodiments, each element is powered to 360 watts (optionally delivered at least in part by true intermediate power) and because the 60 watt fan is on, the total power consumption is about 1500 watts. The maximum cooking time allowed in the pizza mode is 40 minutes. The default cooking temperature in the pizza mode is 450 degrees Fahrenheit.

The thermistor 870 in the oven may provide oven temperature feed back information that allows the processor 801 to compensate for the internal temperature of the oven, by reducing the cooking time as required.

When the Start button is pressed in the Pizza mode, the oven preheats until the selected temperature has been reached. PREHEATING flashes on the display, and an audible sound then indicates that the oven has reached the selected temperature, and the timer starts to count down automatically.

Cookies Mode

When the cookies mode has been selected by a user, the top middle element is off but the other elements are powered equally to about 360 watts. With the inclusion of the convection fan, the total power consumption is about 1500 watts. The default cooking temperature for cookies is 350 degrees Fahrenheit (optionally delivered at least in part by true intermediate power) but this can be modified by the user. In the cookies mode, the default baking time is 12 minutes (after the oven preheats to the selected cooking temperature). The preheat time is typically five minutes. If the frozen food preference is selected by the user, the cooking time is adjusted upward by about 2 minutes.

When the Start button is pressed in the Cookies mode, the oven preheats until the selected temperature has been reached. PREHEATING flashes on the display, and an audible sound then indicates that the oven has reached the selected temperature, and the timer starts to count down automatically.

Reheat Mode

When the reheat mode has been selected by a user, the top middle element is off and the other elements are powered equally to approximately 360 watts each. Because the convection fan is defaulted to "on" the total power consumption is about 1500 watts. In the reheat mode, the default cooking time is 15 minutes with a maximum setting of one hour. The default temperature in the reheat mode is 350 degrees Fahrenheit (optionally delivered at least in part by true intermediate power).

Keep Warm Mode

When a user selects the keep warm mode, the top middle element is off and the other elements are powered equally to 360 watts each. The default warming temperature is 160 degrees Fahrenheit and the default warming time is 60 minutes. The maximum keep warm time is two hours. In the keep warm mode, the frozen food function is disabled. The convection default is off but may be activated by the user.

The thermistor 870 in the oven may provide oven temperature feed back information that allows the processor 801 to compensate for the internal temperature of the oven.

As shown in FIG. 13 the printed circuit board 1251 previously disclosed with reference to FIG. 8 may contain zero crossing sensor circuitry 1252. The zero crossing sensor 1252 uses a diode and transistor arrangement with suitable resistors and capacitors so as to provide a signal 1253 to the oven's integrated circuit type controller 1254 every time the wave of the 12AC power supply to the PCB reaches zero volts. This provides the controller 1254 with signal information from which the frequency of the input power can be determined. Given the zero crossing signal, the controller 1254 can then drive the triacs and associated circuits to manipulate the wave form of the AC power that is supplied to the one or more heating elements that are dimmed, that is, adapted to deliver true intermediate power. Schematic representations of the AC wave forms that result in dimming or true intermediate power 1255, as supplied by the PCB 1252 to the elements are exemplified in FIGS. 14A, 14B, 14C, 14D, 14E.

As shown in FIG. 14A, the wave form of the AC power supplied to the top element 1301 and to the bottom element 1302, during toasting, is uniform and generally represents the maximum power available to an element at any given time. In a bread toasting mode, it is advantageous to supply the maximum available power so that the bread browns quickly without drying out.

In FIG. 14B wave forms are illustrated for the top element 1303 and the bottom element 1304 during, for example, a bake mode. As suggested by FIG. 14B an AC wave group comprising seven full and uninterrupted waves 1305 is followed by an interruption equivalent to a duration of two wave lengths 1306 during which the controller 1204 reduces the power output to zero. Thus out of a duration of nine consecutive wave lengths, only seven continuous wave lengths are provided. In preferred embodiments, the top element uses this scheme 1303 while the scheme 1304 of the bottom element has eight continuous full power waves 1307 followed immediately by a one wave length duration interruption in power 1308. Accordingly, the bottom element is producing more true intermediate power than the top element.

As suggested by FIG. 14C the bottom element in a roasting mode is supplied with a continuous maximum power wave form 1309. In this same roasting mode, the wave form of the top element 1310 comprises a wave group of seven continuous AC cycles 1311 followed by an interval equivalent to three wave lengths of power interruption 1312. Accordingly, the bottom element can be seen operating in full power while the top element only receives seven out of every ten cycles of AC power.

A typical cooking cycle associated with a bake mode is illustrated in FIG. 15. As suggested by this graph, the oven's (actual or inferred cavity) temperature begins at room temperature 1501 and rises evenly until the oven's thermistor detects a temperature that is equivalent to an oven 72a target oven centre temperature 1502. In this example, the target temperature 1502 is 210 C. During this pre-heating phase 1503 both the upper and lower elements are on at a true intermediate power. In this example, the top elements are using 720 W and the bottom elements are consuming 720 W giving a total power draw of 1440 W, for example, provide gentle heat and to conform to regulatory requirements. When the measured oven cavity temperature reaches the target temperature 1504 the top and bottom elements cycle on and off together, providing an average centre temperature, over time that equates to the target temperature 1502.

As shown in FIG. 16, a typical toasting cycle begins with the thermistor measured (inferred) oven cavity temperature being at room temperature 1601. During toasting, two top elements and two bottom elements are at full power delivering a total of 1800 W until this first toast cycle finishes 1602. The duration of the first toast cycle 1603 is determined by the oven's microprocessor in a predictive manner taking into account user inputs relating to the number of pieces of toast (oven load), the initial oven cavity temperature and the level of colour or darkness selected by the user. The graph in FIG. 16 also shows the fall in oven cavity temperature 1604 that occurs when the door is opened and the cooked toast is removed. In this example, a second toast cycle 1605 is commenced with an initial over cavity temperature 1606 that is higher than room temperature. This second cycle also provides 1800 W of cooking power, delivering full power to two top and two bottom elements. This full power phase of the toast cycle continues until the oven cavity temperature reaches a pre-established first threshold that is programmed into the microprocessor. In this example, the first threshold temperature is 210 C. When this first threshold is exceeded, the power to the two top and two bottom elements is reduced to a total power of 1620 W, divided equally between the top and the bottom elements. The duration of this second user initiated toasting cycle is determined by the oven's microprocessor, in a predictive matter, taking into account the oven's starting temperature, the number of slices requested by the user (oven load) and the level of darkness or colour requested by the user. This reduced power phase 1606 continues until the oven centre temperature reaches a level just short of a second threshold 1607. In this example, the second threshold is 250 C. Just before the second threshold temperature, the top elements begin to turn on and off, simultaneously, at a time interval ranging between 5 and 20 seconds so as to keep the oven centre temperature below the second threshold. In this way, overcooking the toast in a hot oven is prevented while still providing some degree of radiant energy to continue the bread toasting or colouration process.

The graph of FIG. 17 illustrates aspects of the bagel mode. Cooking bagels in a bagel mode occurs over a time duration 1701 that is determined by the microprocessor, in a predictive manner, taking into consideration the number of bagel pieces being cooked (oven load), the initial temperature (initially room temperature) and the level of colour or darkness requested by the user. The first bagel cooking phase in the cooking cycle 1702 occurs for approximately 150 seconds with full power being delivered to two top elements and two bottom elements. This provides a maximum power cooking phase delivering 1800 W. At the end of the first phase 1703 (about 150 seconds) the bottom elements are turned off and the top elements continue cooking at an increased combined power of 1440 W using a third element. This second phase continues until the end of the first cycle 1705. The graph of FIG. 17 then illustrates the drop in oven centre temperature 1706 caused by the opening of the oven door and the removal of the bagels from within. In this example, a second bagel toasting cycle begins at a temperature that is elevated from room temperature 1707. Initiation of the second cycle causes a phase similar to the first phase of the first cycle 1702, that is, about 150 seconds with the two top and two bottom elements delivering a total of 1800 W, that is, the top pair and the bottom pair of elements each delivering 900 W per pair. The duration of the second bagel toasting cycle is also determined by the microprocessor, in a predictive manner taking into account the initial oven centre temperature 1707, the oven load and the darkness selected by the user. A third bagel toasting cycle is shown as beginning at an initial temperature 1708 that is higher again than the starting point for the second toasting cycle. However, in a bagel mode toasting cycle where the oven centre temperature reaches a predetermined threshold 1709, the bottom elements are turned off and the top elements continue cooking at power of 1440 W using the fifth oven element. Thus, the first phase 1710 of this third cycle is truncated, terminating when the threshold temperature 1709 is achieved. In this example, the threshold temperature is 210 C. Where the cooking cycle is long, for example, when the oven load is high and the darkness setting is high the three top elements (or two top elements if there are only two) will cycle from on to off every 5-20 seconds to keep the oven centre temperature below a second predetermined threshold 1711. In this example, the second threshold 1711 is 250 C.

While the present invention has been disclosed with reference to particular details of construction, these should be understood as having been provided by way of example and not as limitations to the scope or spirit of the invention.

What is claimed is:

1. A counter top multi-function oven, the oven having at least a baking and a toasting mode, the oven comprising:
   a first rotating input dial being a function selector that enables a user selection of at least the baking mode and the toasting mode;
   the graphic display area comprising a function selection indicator displayed as a vertical list, a first and upper alphanumeric portion, a second and lower alphanumeric portion and a toast shade selection indicator located above both the first and second alphanumeric portions;
   in the bake mode, a second rotating input dial is used to allow a user selection of a bake time, the second alphanumeric portion indicating the selected bake time and the first alphanumeric portion indicating the selected bake temperature; and wherein
   in the toasting mode, the second rotating dial is used to allow a user selection of a toasting load, the second alphanumeric portion indicated the toasting load and the shade selection indicator displays a shade.

2. The oven of claim 1, wherein:
the graphic display is located above the first and second rotating input dials.

3. The oven of claim 1, wherein:
the function selector also allows a user selection of a pizza mode; and
in the pizza mode, the second dial is used to enables a user selection of a pizza load, the pizza load is displayed in the second alphanumeric portion and a pizza cooking temperature is displayed in the first alpha numeric portion.

4. The oven of claim 1, wherein:
the toast shade selection indicator shows representations of toasted bread.

5. The oven of claim 1, wherein:
the first rotating input dial is above the second input dial.

6. The oven of claim 1, wherein:
the mode selector also enables the user to select a broil mode;
the oven having three top elements and two bottom elements; and
when in the broil mode, the three top elements and the two bottom elements are not on at the same time.

7. The oven of claim 6, wherein:
the three top elements comprise a front element, a rear element and a middle element;
the middle element being cycled and powered to a higher wattage than either of the front or the rear elements.

8. The oven of claim 7, wherein the middle element is associated with a perforated shield.

9. The oven of claim 6, wherein:
the three top elements comprise a front element, a rear element and a middle element and a maximum wattage of the middle element is higher than a maximum wattage of either the front or rear element.

10. The oven of claim 6, wherein:
the top elements comprise a front, rear and a middle element; and
when the middle element is on, both bottom elements are off and when both bottom elements are on, the middle element is off.

11. The oven of claim 10, wherein:
in the toasting mode, the middle element is off and the other elements are powered to at least 1800 watts.

12. The oven of claim 6, wherein:
a relay is used to toggle between the operation of a top middle element and the two bottom elements, rendering it impossible to operate the top middle element and the bottom elements are the same time.

* * * * *